United States Patent Office 2,954,760
Patented Oct. 4, 1960

2,954,760

DEVICE FOR CONTROLLING THE AIR INLET THROTTLING MEMBER OF A GAS OR DUAL FUEL OPERATED INTERNAL COMBUSTION ENGINE

Hans Rudolf Hug, Winterthur, Switzerland, assignor to Schweizerische Lokomotiv- und Maschinenfabrik, Winterthur, Switzerland Filed July 13, 1959, Ser. No. 826,677

Claims priority, application Switzerland July 16, 1958

4 Claims. (Cl. 123—27)

The invention relates to a device for controlling the air inlet throttling member of gas or dual fuel operated internal combustion engine of the type in which gaseous fuel and air are admitted into a mixing chamber arranged ahead of each cylinder, and enter into the cylinder through a common inlet valve, the inlet throttling member being controlled by the speed governor through the intermediary of a servo-motor.

In known internal combustion engines of this type, a manually adjustable mechanical connection is provided between the governor and the air throttling member. Such an adjustment of the connecting linkage is required when the engine does not run at the correct rate of operation, for example when the atmospheric conditions change (as may be the case when the height above sea level of the operating place is changed, or upon a change of climatic conditions). The object of the invention is to facilitate the adjustments to the particular conditions of operation and to have them automatically effected within predetermined limits, for the purpose of obtaining a particular utilization of the engine, as well as an improved fuel economy.

According to the invention the pressure in an air manifold arranged ahead of the mixing chambers is effective to produce a resetting action on the regulating means of said air inlet throttling member.

In a preferred embodiment of the invention the regulating linkage is provided with cam means of a shape which permits the maintaining of the position of the throttling member in a predetermined dependence on the air pressure in said manifold.

The accompanying drawings illustrate by way of example an embodiment of the invention.

Figure 1:
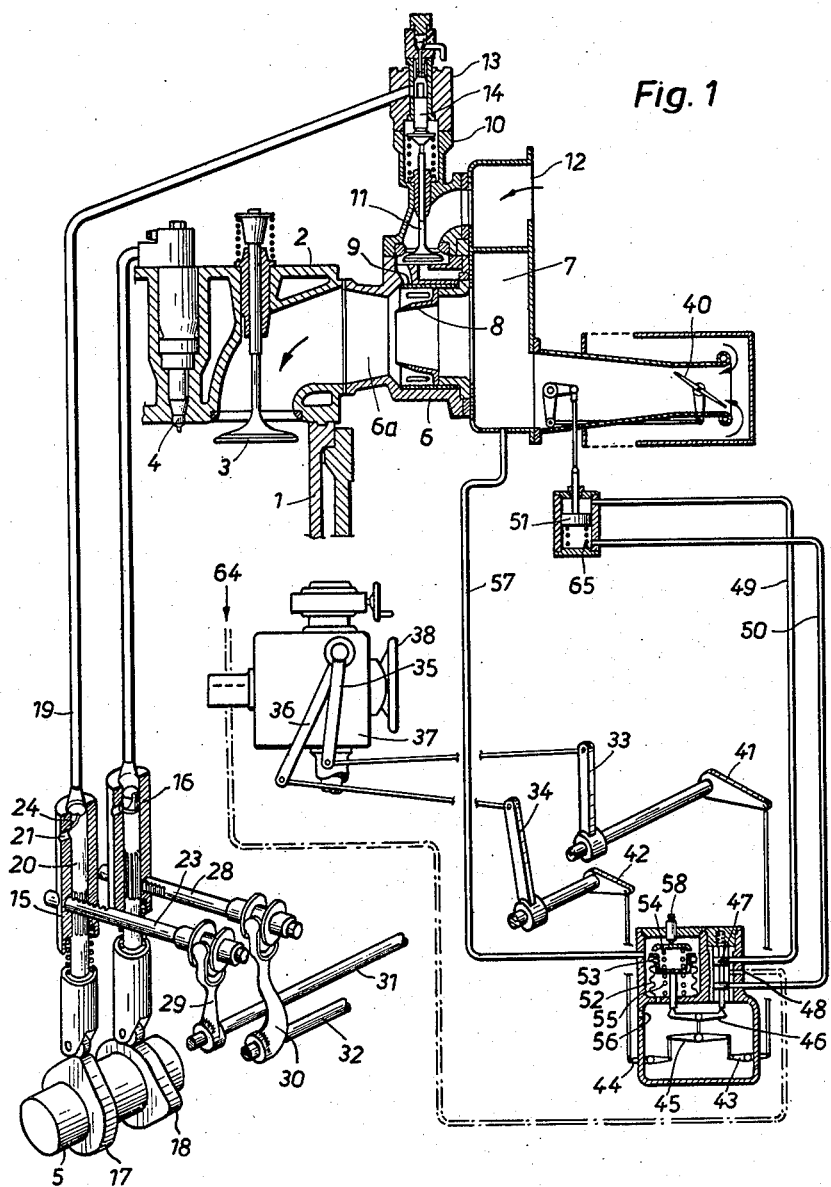
Figure 1 is a diagrammatic view illustrating the device according to the present invention.

In Figure 1, a dual fuel internal combustion engine of the four stroke cycle type and operating by an ignition jet, is represented by a cylinder 1, a cylinder cover 2, an inlet valve 3, an injection nozzle 4, and a cam shaft 5. The admission and mixing means for air and gaseous fuel are positioned at the right hand side of the cylinder cover 2. Each cylinder is provided with its own mixing casing 6 for gas and air, which contains a mixing chamber 6a and is secured to the cylinder cover 2 and connected to the air manifold 7 common to all cylinders. An air nozzle 8 and a mixing ring 9 are mounted within the casing 6, which supports the casing 10 of a gas admission valve 11. The valve casing 10 communicates laterally with the gas feed conduit 12. The mixing chamber 6a is situated immediately downstream of the gas supply regulating member and is formed as a concentric ejector having an internal air nozzle, which promotes the mixture of air and gas. The gas admission valve 11 is hydraulically actuated by a piston 14 movable in a cylinder 13 mounted on the valve casing 10.

Operation of the gas admission valve actuating pump 15 and of the fuel injection pump 16 of the various cylinders of the engine is effected by means of cams 17 and 18 of the cam shaft 5. The gas control cam 17 imparts a stroke to the piston 20 during the admission period. When the inclined control edge 24 covers the suction opening 21, the piston 20 delivers control fluid through the conduit 19, so that fluid pressure on the piston 14 acts to open the gas admission valve 11. The piston 20 can be angularly turned within certain limits by the rack 23, so that the inclined control edge 24 closes the suction opening 21 at an earlier moment or not at all. In this manner, a full charge or a partial charge of control fluid, or no fluid is delivered to the cylinder 13, so that the stroke of the gas admission valve 11 is variable. The fuel injection pump 16 cooperates in similar manner with the rack 28. The racks 23 and 28 are connected with a speed governor lodged in the governor casing 37, by means of levers 29 and 30, shafts 31 and 32, and levers 33, 34, and 35, 36. A hand wheel 38 serves to manually adjust the rate of admission of gas and fuel oil to the engine, for example as described in my copending patent application Serial No. 765,410.

The transmission of the control movements produced by the governor to the throttle member 40 at the air inlet to the engine cylinders also is effected by servo-motor action. For this purpose the levers 41, 42 keyed to the shafts 31, 32 are connected with one of the ends of small double armed levers 43 and 44, respectively, the other ends of these latter being connected to a lever 45 which in turn is connected to a lever 46. Upon the occurrence of regulating movements, the left end of the lever 46 first acts as fixed fulcrum, so that these movements will be transmitted to the servo-motor regulating slide 47. According to the direction of the regulating movements control fluid flows from the entrance 48 to one or the other of the two conduits 49 and 50 and displaces the servo-motor piston 51 downwardly or upwardly, thus causing a corresponding tilting movement of the throttle member 40.

For returning or resetting the control slide 47 to its original position there is provided a special device having a pressure feeler member. It essentially comprises a resiliently yieldable pressure responsive vessel 52 which is provided with an air-tight closure in the form of a spring washer 53 maintained between upper and lower springs 54 and 55. The interior of the pressure container 52 communicates with the atmosphere through openings 56, while the space outside of the container 52 is connected to the air manifold 7 by a conduit 57.

When for example an increase of load of the engine occurs, the gas regulating lever 35 turns towards the left in Figure 1 and causes through the action of the servo-motor a rotation of the air throttle member 40 in the counterclockwise direction, thus admitting more air through the inlet. The throttling of the air passage is decreased and accordingly also the pressure drop behind the throttle, within the manifold 7, decreases, i.e. the air pressure in the manifold slightly increases. This pressure increase is transmitted to the space outside of the pressure responsive vessel 52 and causes a depression of the spring washer 53 which, through the action of the lever 46, restores the control slide 47, after a few oscillations, to its zero position. The described regulating members are operated similarly, but with reversed movements upon a decrease of the engine load.

The effect of the described operation of restoring the regulating member 47 to its normal position is that the air pressure corresponding to a determined load condition of the engine is automatically controlled. Besides, the combustible mixture is formed independently of the engine speed, which is important for the acceleration power of the engine. In a case where the engine will have to operate at considerably different barometric pressure, for example when the power plant is transferred to a different altitude (height above sea level), the limits within which the regulation of the predetermined air pressure values $p_{LK}$ is automatically maintained would be exceeded. The range of regulation can be modified upon such changed conditions at the same time as the starting position of the spring washer 53 is adjusted by a slight rotation of the regulating screw 58 by hand. Instead of the manually actuated screw, an automatically operating adjusting device could be provided which would be responsive to a change of atmospheric conditions (barometric height) and/or to a change in the ambient temperature.

Figure 2:
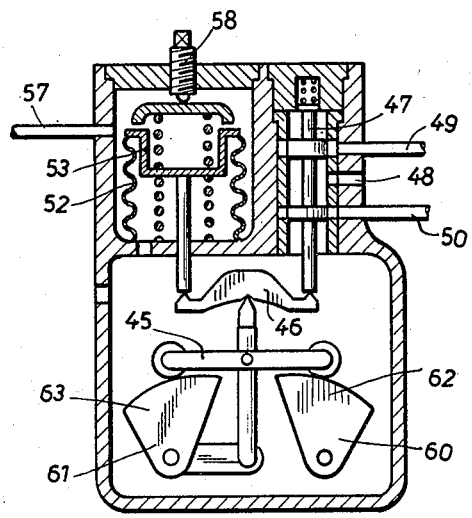
Figure 2 shows sectional view of a modified part of the device of Figure 1.
Figure 3:
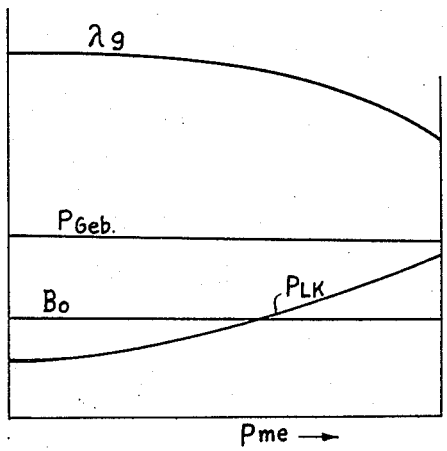
Figure 3 is a graph showing the load characteristics of the device of Fig. 1.

As a modification of the pressure responsive device in Figure 1 a device according to Figure 2 could be provided. Instead of a transmission linkage 43—45, this modified device comprises levers 60 and 61 having cam faces. By means of such levers it would be possible to provide a non-linear response and to achieve practically any desirable characteristic of the pressure performance. For example, for a pure gas engine, the characteristic can be based on the curve determined from Figure 3, according to which the air excess number $\lambda g$ and the absolute air pressure $p_{LK}$ in the manifold 7 in proportion to the actual barometric pressure $Bo$ or to the starting pressure $P_{Geb}$ of a supercharging blower are determined depending on the desired specific piston load $p_{me}$. When transforming the operation to another type of gas, the cam levers 60 and 61 can simply be replaced by others.

For dual fuel operation, i.e. for liquid and gaseous fuel in any desired proportion, the air pressure in the manifold must correspond to the consumption of both types of fuel. In this case the regulation of the liquid fuel must also be effected, by means of the governor actuated members, i.e. lever 34, shaft 32, lever 42, small lever 44, and cam lever 61. Both fuels influence the position of the small lever 46 and accordingly of the control slide 47. The control movements will be superposed and the final position of the air inlet throttle will be the result of the combined movements of both regulating linkages operated by the levers 35 and 36.

On the other hand, when the engine is operated as a pure diesel engine, the supply of control fluid 64, such as oil from the lubricating system of the engine, to the fluid inlet 48 is stopped by a corresponding actuation of the handwheel 38 by the operator. Now the transmission of pressure to the servo-piston 51 ceases. The piston is urged into its top position by the spring 65, whereby the throttle member 40 turns to the fully open position and remains in this position. The engine then operates without any additional control of the air supply.

I claim:

1. In a gas or dual fuel operated internal combustion engine having a speed governor, the combination of a mixing chamber ahead of each cylinder for mixing gaseous fuel and air, a common air manifold arranged ahead of the mixing chambers, said manifold having an air inlet opening, a throttling member for controlling the air supply through said inlet opening, a speed governor responsive control slide operatively connected to said throttling member, restoring means for said control slide including a closed chamber communicating with said air manifold, a resiliently yielding pressure responsive vessel in said closed chamber operatively connected to said control slide, and connecting linkage between said pressure responsive vessel and said control slide, whereby the pressure in said air manifold is effective to restore the control slide to its normal position after having been displaced by governor action to adjust said throttling member.

2. In a gas or dual fuel operated internal combustion engine having a speed governor and a mixing chamber ahead of each cylinder for mixing gaseous fuel and air, the combination of a common air manifold arranged ahead of the mixing chamber, said manifold having an air inlet opening, a throttling member for controlling the air supply through said opening, hydraulically operated actuating means for said throttling member, a speed governor responsive control slide operatively connected to said actuating means, servo-motor means including a closed chamber communicating with said air manifold, a resiliently yielding, spring loaded pressure responsive vessel in said closed chamber, and connecting linkage between said pressure responsive vessel and said control slide, whereby the control slide is restored to its normal position by the action of the pressure in the air manifold after having been displaced by said governor to adjust the air throttling member.

3. A device as claimed in claim 1, in which the control linkage of the servo-motor comprises cams arranged to enable maintenance of a predetermined dependence of the throttling member position from the pressure in the air manifold.

4. A device as claimed in claim 1 in which two springs are provided which act on said pressure vessel in opposite directions to subject the pressure vessel to the difference in pressure of said two springs, and a spring tensioning means for adjusting the position of said vessel so that the load of the engine can be adapted to a considerably varying barometric pressure and ambient temperature.

References Cited in the file of this patent

UNITED STATES PATENTS

| 664,025 | Nash | Dec. 18, 1900 |
| 2,221,201 | Pope et al. | Nov. 12, 1940 |
| 2,900,968 | Kauffmann | Aug. 25, 1959 |